United States Patent
Koehler et al.

(10) Patent No.: US 12,479,125 B2
(45) Date of Patent: Nov. 25, 2025

(54) CONCRETE COMPOSITION SUITABLE FOR 3-D PRINTING AND A METHOD FOR 3-D PRINTING OF MULTIPLE LAYERS OF CONCRETE

(71) Applicant: Titan America LLC, Norfolk, VA (US)

(72) Inventors: Eric Koehler, Raleigh, NC (US); SooDuck Hwang, St. Johns, FL (US); George Pantazopoulos, Roanoke, VA (US)

(73) Assignee: Titan America LLC, Norfolk, VA (US)

( * ) Notice: Subject to any disclaimer, the term of this patent is extended or adjusted under 35 U.S.C. 154(b) by 469 days.

(21) Appl. No.: 18/104,379

(22) Filed: Feb. 1, 2023

(65) Prior Publication Data

US 2023/0256650 A1    Aug. 17, 2023

Related U.S. Application Data

(60) Provisional application No. 63/310,396, filed on Feb. 15, 2022.

(51) Int. Cl.
| | |
|---|---|
| *B28B 1/00* | (2006.01) |
| *B33Y 10/00* | (2015.01) |
| *B33Y 70/00* | (2020.01) |
| *C04B 18/162* | (2023.01) |
| *C04B 20/00* | (2006.01) |
| *C04B 103/00* | (2006.01) |
| *C04B 103/12* | (2006.01) |
| *C04B 103/32* | (2006.01) |
| *C04B 103/56* | (2006.01) |

(52) U.S. Cl.
CPC ............ *B28B 1/001* (2013.01); *C04B 18/162* (2013.01); *C04B 20/0048* (2013.01); *B33Y 10/00* (2014.12); *B33Y 70/00* (2014.12); *C04B 2103/0079* (2013.01); *C04B 2103/12* (2013.01); *C04B 2103/32* (2013.01); *C04B 2103/58* (2013.01)

(58) Field of Classification Search
CPC ... B28B 1/001; C04B 18/162; C04B 20/0048; C04B 2103/0079; C04B 2103/12; C04B 2103/32; C04B 2103/58; C04B 18/12; C04B 28/04; C04B 28/06; C04B 2103/10; C04B 2111/00181; C04B 28/02; C04B 28/065; B33Y 10/00; B33Y 70/00; B33Y 70/10; B28C 7/024; B28C 7/026; B28C 7/0418; Y02W 30/91
See application file for complete search history.

(56) References Cited

U.S. PATENT DOCUMENTS

| | | |
|---|---|---|
| 5,520,730 A | 5/1996 | Barbour |
| 5,879,445 A | 3/1999 | Guicquero et al. |
| 8,092,589 B2 | 1/2012 | Mosquet et al. |
| 8,220,344 B2 | 7/2012 | Turpin, Jr. |
| 8,226,765 B1 | 7/2012 | Buesing et al. |
| 8,303,708 B2 | 11/2012 | Rigaud et al. |
| 8,394,191 B2 | 3/2013 | Bury |
| 8,808,449 B2 | 8/2014 | Jezequel et al. |
| 9,039,830 B2 | 5/2015 | Alhozaimy et al. |
| 9,174,869 B2 | 11/2015 | Guzzetta et al. |
| 9,353,007 B2 | 5/2016 | Eberwein et al. |
| 9,388,078 B2 | 7/2016 | Rael |
| 9,834,476 B2 | 12/2017 | Feng et al. |
| 9,834,479 B2 | 12/2017 | Gong et al. |
| 9,963,390 B2 | 5/2018 | Hoornaert et al. |
| 10,577,284 B2 | 3/2020 | Yurdakul et al. |
| 10,604,449 B2 | 3/2020 | Terrasi et al. |
| 11,117,833 B2 | 9/2021 | Kamitani et al. |
| 2008/0072800 A1 | 3/2008 | Hughes |
| 2008/0087199 A1 | 4/2008 | Gartner |
| 2009/0305019 A1 | 12/2009 | Chanvillard et al. |
| 2011/0095227 A1 | 4/2011 | Herth et al. |
| 2014/0252668 A1 | 9/2014 | Austin et al. |
| 2015/0152008 A1 | 6/2015 | Langlotz |
| 2015/0307401 A1* | 10/2015 | Chen ...................... C04B 28/04 106/714 |
| 2018/0057405 A1 | 3/2018 | Al-Chaar et al. |
| 2019/0119163 A1 | 4/2019 | Dengler et al. |
| 2019/0194072 A1 | 6/2019 | Esnault et al. |
| 2020/0001520 A1 | 1/2020 | Lootens et al. |

(Continued)

FOREIGN PATENT DOCUMENTS

| | | | |
|---|---|---|---|
| CN | 107417204 | 12/2017 | |
| CN | 108298888 A * | 7/2018 | ............ C04B 28/00 |

(Continued)

OTHER PUBLICATIONS

Kruger et al., "3D Printable Concrete Technology and Mechanics", Technical Paper, Sep. 2019.

Skripkiūnas et al., "Effect of Calcium Nitrate on the Properties of Portland-Limestone Cement-Based Concrete Cured at Low Temperature", MDPI, Basel, Switzerland, pp. 1-25, Mar. 25, 2021.

Jensen, "Use of Superabsorbent Polymers in Concrete", Concrete International, pp. 48-52, Jan. 2013.

Bos et al., "Additive manufacturing of concrete in construction: potentials and challenges of 3D concrete printing", 4 Virtual and Physical Prototyping 2016, vol. 11, No. 3, pp. 209-225, Jul. 4, 2016.

(Continued)

*Primary Examiner* — Anthony J Green
(74) *Attorney, Agent, or Firm* — Williams Mullen; F. Michael Sajovec

(57) ABSTRACT

A concrete composition having an optimized formulation and suitable for 3-D printing is provided. The composition may include a hydraulic cement composition, aggregate, cement and/or aggregate by-product dust, one or more rheology modifiers, a plasticizer, fibers, and a sufficient amount of water to effect setting of the composition. Optionally the concrete composition may include a setting agent. A method for 3D printing multiple layers of the concrete composition is also provided.

24 Claims, No Drawings

(56) References Cited

U.S. PATENT DOCUMENTS

| | | |
|---|---|---|
| 2021/0129377 A1 | 5/2021 | Mo et al. |
| 2021/0261461 A1 | 8/2021 | Jianzhuang et al. |
| 2021/0284575 A1 | 9/2021 | Martinage et al. |
| 2021/0317042 A1 | 10/2021 | Rampinelli et al. |
| 2022/0002202 A1* | 1/2022 | Sampson ............ C04B 28/021 |

FOREIGN PATENT DOCUMENTS

| | | |
|---|---|---|
| EP | 3421201 | 6/2020 |
| WO | 2020187740 | 9/2020 |

OTHER PUBLICATIONS

Cho et al.: "3D Printing Concrete Technology and Mechanics", Concrete Beton, Sep. 1, 2019 (2019-09-01), pp. 11-18, XP093052676, South Africa.

European Patent Office, International Preliminary Report on Patentability, for International Patent Application No. PCT/ US2023/ 012194, Aug. 20, 2024.

\* cited by examiner

CONCRETE COMPOSITION SUITABLE FOR 3-D PRINTING AND A METHOD FOR 3-D PRINTING OF MULTIPLE LAYERS OF CONCRETE

RELATED APPLICATION

The present application claims priority to U.S. Provisional No. 63/310,396, filed Feb. 15, 2022, the disclosure of which is incorporated by reference in its entirety.

FIELD OF THE INVENTION

The present invention relates to concrete compositions and the 3-D printing of such compositions.

BACKGROUND

Concrete is the reaction product of hydraulic cement, aggregates (e.g., sand) and water. Water is a reactant but also provides flow sometimes referred to as "spread" and/or "slump". Flow is important to avoid formation of voids that reduce strength and other defects. Various additives may be included in the concrete to modify flow and various other properties such as rheology, water retention, and set time.

The 3-D printing of concrete by an additive manufacturing (AM) process is emerging. AM is a process by which multiple layers of a solid material are printed one on top of another. The AM process utilizes computer aided design (CAD) of an object in which software records a series of digital slices of the overall object. The pattern or design of each of the layers is used to control a 3-D printer and each respective layer is defined by the digitized pattern or design for the layer.

Printing of concrete via an AM process utilizes a computer-controlled extrusion process in which the concrete is mixed, pumped through a hose to a nozzle and then deposited as thin layers (approximately 0.5 to 2 inches) at a rate of as quickly as possible, preferably of 0.2 ft/sec to 1 ft/sec per layer, that must support each subsequent layer applied serially. These layers of concrete must be able to set and gain strength rapidly. The concrete must be flowable when mixed, pumped, and extruded, and then gain dimensional stability and green strength to maintain strength and to support subsequent layers. And, the overall method must be controllable. Because concrete is most often printed at an outdoor site, the concrete composition should also be adaptable to changes to its environment such as ambient and material temperature, humidity, wind, print speed and build height. Additionally, there may be material changes in that local materials are often used to avoid supply-chain issues related to transportation.

Thus, there is a need for a concrete composition and method of 3-D printing such composition that optimizes the properties of the concrete and balances changing environmental or material conditions. Such concrete composition should be highly flowable, pumpable and extrudable, stabilize rapidly, develop significant green strength after application, exhibit low shrinkage and low propensity to crack, and be adaptable to changing conditions while using readily available raw materials and conventional computer-guided concrete printing equipment.

SUMMARY

It should be appreciated that this Summary is provided to introduce a selection of concepts in a simplified form, the concepts being further described below in the Details Description. This Summary is not intended to identify key features or essential features of this disclosure, nor is it intended to limit the scope of the invention.

A concrete composition having an optimized formulation and suitable for 3-D printing is provided. The composition may include a hydraulic cement composition, aggregate, cement and/or aggregate by-product dust, one or more rheology modifiers, a plasticizer, fibers, and a sufficient amount of water to effect setting of the composition. In one embodiment, the composition may include a superabsorbent polymer (SAP). In other embodiment, the composition may include clay as the additional rheology modifier.

In yet another embodiment the method may include providing a mixture of the concrete composition, measuring environmental conditions, determining a target concrete temperature, a desired vertical and horizontal print rate and a desired height or layer thickness, initiating mixing of the concrete composition with a mixing unit for dosing a setting control agent and/or additional rheology modifier to the concrete composition mixture based on measured environmental conditions, measuring an operating condition of a mixing unit to provide a target operating condition based on predetermined target concrete temperatures, desired horizontal and vertical print rates, and desired layer thickness, adjusting dosing of water, setting control agent, rheology modifier or plasticizer based on the measured operating condition and achievement of target operating condition, applying the concrete composition to a base surface, and then measuring and adjusting steps for each layer of the 3-D printing.

DETAILED DESCRIPTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

The term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more.

Percentages of the composition are based on mass percent of total solid ingredients. The dosages of chemical additives are expressed as active ingredients and do not include water or inactive carriers that facilitate handling and dispensing.

All patents, patent applications and publications referred to herein are incorporated by reference in their entirety. In case of a conflict in terminology, the present specification is controlling.

In accordance with one embodiment of the invention, a concrete composition suitable for 3-D printing may be provided. The concrete composition may include a hydraulic cement composition, aggregate, cement and/or aggregate by-product dust, one or more rheology modifiers, a plasticizer, fibers, and a sufficient amount of water to effect setting of the concrete composition. The concrete composition may further include a superabsorbent polymer (SAP), a setting control additive, a shrinkage control additive, and/or various other concrete additives known to those skilled in the art.

The hydraulic cement composition may be portland cements, blended cements, pozzolanic cements, gypsum cements, aluminous cements, magnesia cements, silica and silica fume cements, and slag cements. In various embodiments, the hydraulic cement may be portland cement meeting ASTM C150 ASTM C1157, portland-limestone cement or portland-pozzolan cement meeting ASTM C595, masonry cement meeting ASTM C91, or plastic cement meeting ASTM C1328. The hydraulic cement may be present in an amount of 20 to 50 mass percent, and often in an amount of 20 to 35 mass percent. Supplementary cementitious materials, which are pozzolanic, may be included and examples are fly ash, slag, silica fume, natural pozzolan, calcined clay, and metakolin. The supplementary cementitious materials may be blended as part of the portland cement or added separately from the portland cement, but in any case are considered part of the hydraulic cement composition.

The aggregate may be fine aggregate, coarse aggregate, or a combination thereof. For concrete, as defined in ASTM C33, fine aggregate is generally considered to be finer than 5 mm and coarse aggregate has a majority of particles larger than 5 mm with a maximum size that may be 9 mm to 40 mm. The fine aggregate may be siliceous sand. Alternative aggregate may include inorganic fillers such as ground limestone or other sources of calcium carbonate, magnesium carbonate, and glass microspheres. The aggregate may be present in an amount of 30 to 60 mass percent, and often in an amount of 30 to 45 mass percent.

Cement by-product dusts are readily available in as much as such dusts are often waste products and have to be disposed of in landfills. Typically dust is 90 percent finer than 300 μm in diameter. The cement by-product dust may be present in an amount of 1 to 40 mass percent of solid components and often in an amount of 10 to 20 mass percent of solid components. Specifically, the cement by-product dust in one embodiment may be cement kiln dust having a $D_{50}$ particle size of less than 10 microns. Cement kiln dust tends to be very fine with 90 percent finer than 10 μm in diameter. Cement kiln dust is a by-product collected during the cement manufacturing process. In such a process, the cement ingredients, such as limestone, clay, fly ash, slag, bauxite and sand may be ground, homogenized and fed to a kiln. This mixture may be heated to about 1450° C. to form what is known as "clinker". The dust generated by this process may be collected at multiple points of the process, and the dust typically includes chloride, sulfur, sodium and potassium. The dust may be partially or fully calcined, which occurs when heat from the kiln drives off $CO_2$ from calcium carbonate, resulting in calcium oxide. The amount of free calcium oxide (free lime) and carbon dioxide may be determined by methods such as ASTM C114 and used to quantify the extent of calcination.

In another embodiment, the by-product dust may be aggregate fracture dust having a $D_{50}$ particle size of less than 200 microns. Aggregate fracture dust is the by-product of the crushed coarse and fine aggregate manufacturing process. During crushing of aggregates, large quantities of undesirable dust are created and are removed by washing or air separation. In the case of washing, a slurry with fine dust is diverted to settling ponds for collection and disposal. More preferably in the case of compositions for 3-D printing, the collection of this dust is controlled to obtain a desired and consistent particle size and eliminate deleterious particles such as expansive clays. Example embodiments include the use of hydrocyclones, sand screws, and flocculants and coagulants.

One or more rheology modifiers may be added along with one or more plasticizers. The term "rheology modifier" is understood to mean a composition which can modify the viscosity of the concrete. Viscosity is an important property of the concrete composition in that each layer of the composition should have a sufficient stability in order to not collapse under its own weight at the same time composition must be able to be extruded. Rheology also includes thixotropy, which is the time-dependent reduction in viscosity under shear and the increase in viscosity under rest. Viscosity is a function of shear rate and may include shear thinning or shear thickening characteristics. A distinction is drawn between plasticizers-which act by dispersing cement grains by steric hindrance and/or electrostatic repulsion, reducing van der wall forces or other means and thereby reducing viscosity—and rheology modifying additives, which improve other rheology characteristics such as inducing thixotropy, shear thinning or shear thickening characteristics, or increasing viscosity.

The one or more rheology modifiers may be present in an amount of 0.001 to 0.2 mass percent, and often in an amount of 0.001 to 0.1 mass percent. Exemplary rheology modifiers are described, for example, in U.S. Patent Publication No. 2019/0194072A1 to Esnault et al. In one embodiment, the rheology modifier may be a starch ether, cellulose ether, cellulose fibers, polyethylene glycol, polyethylene oxide, polyvinyl alcohol, diutan gum or welan gum, polyacrylamide, alkali swellable emulsions or blends or mixtures thereof. In another embodiment, the rheology modifier may be a water swellable high molecular weight copolymer such as Starvis® S3911F available from BASF. In yet another embodiment, an exemplary rheology modifier may be a water soluble high molecular weight polymer such as Starvis® 3040F available from BASF. Other exemplary rheology modifiers include Chryso VMA 25, Master Builders MasterMatrix VMA 362 or MasterMatrix VMA 450, GCP Applied Technologies VMAR-3, and Sika Stabilizer. Other exemplary rheology modifiers are proposed in U.S. Pat. No. 8,394,191 B2 to Bury.

Clay such as sepiolite clay may also be included and may function as a rheology modifier. Clay may be present in an amount of 0.01 to 0.5 mass percent, and often 0.1 to 0.2 mass percent. Other clays include smectite (bentonite) and attapulgite.

The term "plasticizer" is understood to mean a composition which can modify the initial binding properties of the concrete and may be used interchangeably with the term rheology modifier. Plasticizers are also sometimes referred to as dispersants in that the plasticizer dispenses cement particles through steric hindrance or modification of surface charge. The plasticizer may be a so-called superplasticizer which may reduce water content needed to reach a certain viscosity by at least 12 percent, and often 30 percent or more. Superplasticizers are described, for example in U.S. Pat. No. 9,174,869 B2 to Guzzetta et al. and may include, but are not limited to formaldehyde condensates of at least one compound selected from the group consisting a methylolation and sulfonation products of each of naphthalene, melamine, phenol, urea, and aniline, examples of which include metal naphthalenesulfonate-formaldehyde condensates, metal melaminesulfonate-formaldehyde condensates, phenolsulfonic acid-formaldehyde condensate, and phenolsulfanilic acid-formaldehyde co-condensates. Superplasticizers may also include the polymers and copolymers obtained by polymerizing at least one monomer selected from the group consisting of unsaturated monocarboxylic acids and derivatives thereof, and unsaturated dicarboxylic acids and derivatives thereof.

In one embodiment the superplasticizer may be a polycarboxylate superplasticizer. The term "polycarboxylate superplasticizer" encompasses a homopolymer, a copolymer, and any combination thereof comprising a polycarboxylic to which other functional groups may be bonded. Preferably, these other functional groups are capable of attaching to cement particles and other functional groups for dispersing the attached cement particle within an aqueous environment. Specifically, polycarboxylate superplasticizers are polymers with a carbon backbone having pendant side chains with the characteristic that at least a portion of the side chains are attached to the carbon backbone through a carboxyl group or an ether group. Exemplary plasticizers include Chryso Quad 842, Master Builders MasterGlenium 7920, Sika Visco-Crete 2100, and GCP Applied Technologies ADVA 190.

A superabsorbent polymer (SAP) may be present in an amount of 0.01 to 0.1 mass percent, and often 0.01 to 0.03 mass percent. The SAP may facilitate internal water curing to promote hydration of the cement and to control shrinkage (and cracking) during hardening. In one embodiment, the SAPs include covalently crosslinked polymers of acrylic acid and acrylamide neutralized by alkalis. In another embodiment, the SAP may be an organic hydrogel such as starch, modified starch, agar, agarose, dextrin, carrageenan, alginic acid, cellulose and cellulose derivatives, polyvinyl alcohols, polyvinyl chlorides, low molecular weight glycols, polyethylene oxides and polyacrylonitriles (See, U.S. Pat. No. 10,604,449 B2)

Shrinkage control agents may be present in an amount of 0 to 5 mass percent, and often 0 to 1 mass percent. Exemplary shrinkage control agents may include low molecular weight glycols, polyalkyleneoxy compounds, terminally alkyl etherified or alkyl esterified oxyalkylene polymers and cyclic acetals of a tri- or polyhydric alcohol. These typically reduce the inherent shrinkage of concrete upon drying. Alternatively, other shrinkage control agents create expansion to offset the inherent shrinkage of cement-based materials. Such agents may include calcium oxide, magnesium oxide and Type K cement. It is noted that there may be some overlap between the terms "SAPs" and "shrinkage control agents" inasmuch SAPs control shrinkage via promotion of hydration. Exemplary shrinkage control agents include Chryso Serenis, Master Builders MasterLife SRA 035, GCP Applied Technologies Eclipse 4500 and SikaControl75.

Setting agents may be present in an amount of 0.1 to 2.0 mass percent, and often 0.01 to 1.0 mass percent. Setting agents may be accelerators or retarders. Exemplary accelerators may include an accelerator salt such calcium nitrate, calcium nitrite, calcium formate, calcium chloride and calcium sulphoaluminate, sodium chloride, aluminum hydroxide, aluminum potassium sulfate, sodium silicate, sodium thiocyanate and calcium thiocyanate. Other accelerators include alkanolamines, such as triethanolamine, diethanolisopropanolamine, and Triisopropanolamine, and THEED. Nanoparticles such as nano calcium silica hydrate may also act as accelerators. Exemplary accelerators include Chryso Turbo Cast 650A, Master Builders MasterSet AC 534, and GCP Applied Technologies Daraset 400. Exemplary retarders slow down the hardening of the concrete composition and may include citric acid and salts thereof, boric acid and salts thereof, phosphoric acid and salts thereof, oxycarbonates such as gluconate and glucoheptonate, keto acid salts, and silicofluoride salts. Exemplary retarders include Chryso NutralSet TC, GCP Applied Technologies Recover and Master Builders Delvo.

A water reducer may be included in addition to the superplasticizer. Exemplary water reducers may include lignosulphonates, hydroxycarboxylic acids, glycerols, polyvinyl alcohols, sodium aluminomethyl-siliconate and sulfanilic acid.

Various fibers may be present in an amount of 0.02 to 1.0 mass percent, and often 0.1 to 0.5 mass percent. Exemplary fibers include glass fibers, silicon carbide, aramid fibers, polyester, carbon fibers, polypropylene, nylon, steel, composite fibers, fiberglass, combinations thereof, fabric containing said fibers, and fabric containing combinations of said fibers. Exemplary fibers include Owens Corning AR HD, Master Builders M35 and Sika Fibermesh HP.

In one embodiment, the present invention provides a method for 3-D printing of multiple layers of the above concrete compositions. The method may utilize a gentry, robotic or crane system such as described in "3-D Printable Concrete Technology" By Cho et al., Concrete Beton, pp 14-18 (September 2019). In each of these systems, concrete may be delivered from a nozzle (or print head) and directed via a nozzle along a predetermined path. In this manner, the concrete composition may be applied to a base surface by extrusion through the nozzle. Exemplary layer heights may be 0.5 inches to 2 inches at a horizontal rate of 0.2 ft/sec to 1 ft/sec. The steps of delivering to and directing the nozzle and application of the concrete composition may be repeated multiple times to build of multiple layers of the concrete composition to form a structure.

In another embodiment, the nozzle and extrusion may be controlled based on measuring environmental conditions and determining a target concrete temperature and a desired print rate and height. A mixture of the concrete composition with or without an accelerator or retarder may be mixed in a mixer. Accelerator, retarder, water and/or additional rheology modifier may be dosed into the mixture using a mixing unit based on the determined environmental conditions. Operating conditions of a mixing unit may also be monitored and measured based on the target concrete temperature, horizontal and vertical print rate and desired height of the layer. The dosing of water, rheology modifier, or plasticizer may be adjusted based on the measured operating conditions and achieving target operating conditions. In this manner, the composition is applied as a layer to a base surface. The steps of measuring the operating conditions and dosing of water rheology modifier or plasticizer may be repeated until multiple layers are printed and the end structure is produced.

In an exemplary embodiment, jobsite conditions like weather, humidity, wind speed, etc. are measured and jobsite requirements are considered. Adjustments to the formulations may be based on feedback from the mixer, including material temperature, ambient temperature and humidity, torque to operate the mixer, pressure to pump material out of the mixer or into the pump, torque to operate the extruder and printing rate. The torque to operate the mixer is preferably measured at least two speeds and the curve of torque vs. speed is used to determine rheology. Torque may be measured directly or is readily related to the amperage or wattage applied to the mixing unit. In addition, determining the amperage to start the mixer after a period of rest with material in the mixer may be used to adjust the dosage of rheology modifier. Alternatively, the pressure or amperage to start the pump after a period of rest may be used to adjust the dosage of one of the components, such as the rheology modifier. To actually adjust the composition, the selected component may be injected into the mixer, either directly or through the water line. It is common to use a continuous mixer, such as a silo mixer where water and dry powder are injected together in a mixing chamber with an in-line metering pump.

In another exemplary embodiment, the method may include:
1) Measuring/determining ambient temperature, humidity, solar radiation, wind speed, and target printing rate (vertical and horizontal);
2) Set dosage of accelerator and retarder if needed;
3) Initiate mixing of concrete. Dose accelerator or retarder, and water through water line;
4) Determine amperage to operate the mixer at one speed and more preferably two different speeds. Determine material temperature;
5) Compare amperages to target amperages and concrete temperature to target concrete temperature;
6) Based on material temperature, ambient conditions, and desired print rates, adjust dosage of accelerator or retarder(s);
7) Based on amperages, adjust dosage of water, plasticizer and/or rheology modifier(s):
   a) Adjust water to reduce or increase the amperage at both low and high speed;
   b) Adjust plasticizer to change amperage to low speed more than at high speed;
   c) Adjust rheology modifier(s) to change amperage at low and high speed; and,
8) Revise dose and determine change in amperage. Based to actual vs. target change, further adjust dosages.

The concrete composition and method utilizing such a composition may be utilized to print a wide range of structures including houses, commercial buildings (e.g., retail, manufacturing and restaurants) and infrastructure (e.g., bridges, abatements, retaining walls, dams, roads, and water/sewer systems). Alternatively, the composition and method may be utilized to print artistic pieces, architectural pieces, furniture, landscaping, and marine structures such as breakwaters.

To further illustrate the invention, the following examples are provided. These examples are provided with no intent to limit the scope of the invention.

Comparative Example and Examples 1-5

The purpose of the tests was to demonstrate properties related to cracking, set time and a print quality index (PQI) of concrete compositions suitable for 3-D printing. Cracking was measured by printing a single layer on a concrete slab. After 24 hours of exposure from extrusion, the frequency of cracks that occurred, if any, was measured. No curing was applied to exacerbate the cracking and simulate severe conditions, so a minimal extent of cracking is acceptable. The single layer increased surface/area to volume ratio, which increases susceptibility to cracking. When proper curing is applied and multiple layers are printed, the amount of cracking will be reduced or eliminated compared to the test condition. Concrete setting time was measured in accordance with ASTM C403. PQI was assessed on a scale of 1 to 5, with 1 being the worst and 5 being the best. The index considered degree of consolidation, surface smoothness, bonding to adjacent layer, ability to retain extruded shape and speed of extrusion.

| Component | Comparative Example Mass (% of Dry Ingredients) | Example 1 Mass (% of Dry Ingredients) | Example 2 Mass (% of Dry Ingredients) | Example 3 Mass (% of Dry Ingredients) |
|---|---|---|---|---|
| Hydraulic Cement | 41 | 37 | 41 | 37 |
| Aggregate | 58 | 58 | 47 | 47 |
| Cement Kiln Dust | 0 | 4 | 0 | 4 |
| Aggregate Fracture Dust | 0 | 0 | 11 | 11 |
| Rheology Modifier | 0.002 | 0.001 | 0.002 | 0.001 |
| Plasticizer | 0.042 | 0.042 | 0.042 | 0.038 |
| Shrinkage Control Agent | 0.40 | 0.40 | 0.40 | 0.41 |
| Fiber | 0.04 | 0.04 | 0.04 | 0.04 |
| Water | 12 | 12 | 12 | 12 |
| Cracking (crack/foot) | 1.4 | 1.1 | 0.8 | 0.5 |
| Set Time (hh:mm) | 5:05 | 4:25 | 5:00 | 4:20 |
| Print Quality Index (PQI) | 3 | 3.5 | 4 | 5 |

The Comparative Example demonstrated a Print Quality Index (PQI) of 3 due to poor consolidation and rough surface. The pour setting time was 5:05 minutes, which will slow down the vertical print rate.

Example 1 shows that the addition of cement kiln dust resulted in faster setting time, which increases the print speed without the addition of expensive accelerating agent. It also improved the PQI and reduced the cracking. Example 2 shows the addition of dust of fracture aggregate fines, also improves the PQI and reduced cracking. Example 3 shows the combination of both cement kiln dust and dust of fracture aggregate fines results in optimal PQI, faster setting time and reduced cracking. As previously noted, the cracking test intentionally exacerbated cracking and this level of cracking in the test would not result in cracking in properly cured printed walls.

Example 4

| Component | Mass (% of Dry Ingredients) |
|---|---|
| Hydraulic Cement | 44 |
| Aggregate | 39 |
| Cement Kiln Dust | 0 |
| Aggregate Fracture Dust | 16 |
| Rheology Modifier | 0.001 |
| Plasticizer | 0.066 |
| Shrinkage Control Agent | 0 |
| Fiber | 0.20 |
| Water | 15 |
| Accelerator | 0.44 |
| Superabsorbent Polymer | 0.02 |
| Clay | 0.10 |
| Cracking (crack/foot) | 0 |
| Set Time (hh:mm) | 3:25 |
| Print Quality Index | 5 |

Example 5

| Component | Mass (% of Dry Ingredients) |
|---|---|
| Hydraulic Cement | 44 |
| Aggregate | 39 |
| Cement Kiln Dust | 0 |
| Aggregate Fracture Dust | 16 |
| Rheology Modifier | 0.002 |
| Plasticizer | 0.076 |
| Shrinkage Control Agent | 0 |
| Fiber | 0.40 |
| Water | 15 |
| Accelerator | 0.30 |
| Superabsorbent Polymer | 0 |
| Clay | 0.10 |
| Cracking (crack/foot) | 0 |
| Set Time (hh:mm) | 3:25 |
| Print Quality Index | 5 |

Example 4 demonstrates that by adding a superabsorbent polymer and clay (acting as a rheology agent) that cracking may be reduced to zero without adversely affecting the set time or print quality index. Example 5 demonstrates that by adding additional fiber and clay that cracking may be reduced to zero without substantially adversely affecting the set time or print quality index.

Many modifications and other embodiments of the invention set forth herein will come to mind to one skilled in the art to which this invention pertains having the benefit of the teachings presented in the descriptions here. Though various methods are disclosed herein, one skilled in the art will appreciate that various other methods now know or conceived in the art will be applied to a subject in conjunction with the compositions and methods of disclosed herein. Therefore, it is to be understood that the invention is not to be limited to the specific embodiments disclosed and that modifications and other embodiments are intended to be included within the scope of the appended claims.

That which is claimed is:

1. A concrete composition suitable for 3-D printing, the composition comprising, expressed by percent of dry components:
    a) 20 to 50 mass percent of a hydraulic cement composition;
    b) 30 to 60 mass percent of aggregate;
    c) 1 to 40 mass percent of cement by-product dust;
    d) 0.001 to 0.2 mass percent one or more rheology modifiers;
    e) 0.02 to 0.5 mass percent plasticizer;
    f) 0 to 5 mass percent shrinkage control agent;
    g) 0.02 to 1.0 mass percent fibers selected from the group consisting of glass fibers, silicon carbide, aramid fibers, polyester, carbon fibers, composite fibers, fiberglass, polypropylene, nylon, steel, combinations thereof and fabrics containing fibers selected from the group, and fabric containing combinations of fibers selected from the group; and
    a sufficient amount of water to effect setting of the composition.

2. The concrete composition according to claim 1, wherein the hydraulic composition is selected from the group consisting of portland cements, blended cements, masonry cement, pozzolanic cements, gypsum cements, aluminous cements, magnesia cements, silica, and silica fume cements, fly ash cements, and slag cements.

3. The concrete composition according to claim 1, wherein the cement by-product dust is cement kiln dust and has a $D_{50}$ particle size of less than 10 microns.

4. The concrete composition according to claim 1, wherein the one or more rheology modifier is clay or a water swellable molecular weight copolymer, or both.

5. The concrete composition according to claim 1, further including a setting agent in an amount of 0.01 to 2.0 mass percent.

6. The concrete composition according to claim 5, wherein the setting control agent is selected from the group consisting of calcium nitrate, calcium nitrite, calcium formate, calcium chloride, sodium thiocyanate, and calcium sulphoaluminate.

7. The concrete composition according to claim 1, wherein the plasticizer is a superplasticizer.

8. The concrete composition according to claim 7, wherein the superplasticizer is a polycarboxylates or at least one compound selected from the group consisting of methylolation and sulfonation products of each of naphthalene, melamine, phenol, urea and aniline.

9. The concrete composition according to claim 1, further including a superabsorbent polymer (SAP) in an amount of 0.01 to 0.1 mass percent.

10. The concrete composition according to claim 1, wherein the shrinkage control agent is selected from the group consisting of glycols, polyalkyleneoxy compounds, terminally alkyl etherified or alkyl esterified oxyalkylene polymers and cyclic acetals of a tri- or polyhydric alcohol.

11. A concrete composition suitable for 3-D printing, the composition comprising, expressed by percent of dry components:

a) 20 to 50 mass percent of a hydraulic cement composition;
b) 30 to 60 mass percent of aggregate;
c) 1 to 40 mass percent of cement by-product dust;
d) 0.001 to 0.2 mass percent one or more rheology modifiers;
e) 0.02 to 0.5 mass percent plasticizer;
f) 0 to 5 mass percent shrinkage control agent;
g) 0.01 to 2.0 mass percent of a setting agent selected from the group consisting of calcium nitrate, calcium nitrite, calcium formate, calcium chloride, sodium thiocyanate, and calcium sulphoaluminate;
h). 0.02 to 1.0 mass percent fibers; and
a sufficient amount of water to effect setting of the composition.

12. The concrete composition according to claim 11, wherein the hydraulic composition is selected from the group consisting of portland cements, blended cements, masonry cement, pozzolanic cements, gypsum cements, aluminous cements, magnesia cements, silica, and silica fume cements, fly ash cements, and slag cements.

13. The concrete composition according to claim 11, wherein the cement by-product dust is cement kiln dust and has a $D_{50}$ particle size of less than 10 microns.

14. The concrete composition according to claim 11, wherein the fibers are selected from the group consisting of glass fibers, silicon carbide, aramid fibers, polyester, carbon fibers, composite fibers, fiberglass, polypropylene, nylon, steel, combinations thereof and fabrics containing fibers selected from the group, and fabric containing combinations of fibers selected from the group.

15. The concrete composition according to claim 11, wherein the one or more rheology modifier is clay or a water swellable molecular weight copolymer, or both.

16. The concrete composition according to claim 11, further including a setting agent in an amount of 0.01 to 2.0 mass percent.

17. The concrete composition according to claim 11, wherein the setting control agent is selected from the group consisting of calcium nitrite, calcium nitrite, calcium formate, calcium chloride, sodium thiocyanate, and calcium sulphoaluminate.

18. The concrete composition to claim 11, wherein the plasticizer is a superplasticizer.

19. The concrete composition according to claim 18, wherein the superplasticizer is a polycarboxylates or at least one compound selected from the group consisting of methylolation and sulfonation products of each of naphthalene, melamine, phenol, urea and aniline.

20. The concrete composition according to claim 11, further including a superabsorbent polymer (SAP) in an amount of 0.01 to 0.1 mass percent.

21. The concrete composition according to claim 11, wherein the shrinkage control agent is selected from the group consisting of glycols, polyalkyleneoxy compounds, terminally alkyl etherified or alkyl esterified oxyalkylene polymers and cyclic acetals of a tri- or polyhydric alcohol.

22. A method for 3-D printing multiple layers of the concrete composition, the method comprising:
a) delivering the concrete composition of claim 1 to a nozzle;
b) directing the nozzle along a predetermined path;
c) applying the concrete composition to a base surface by extrusion through the nozzle;
d) repeating steps b) and c) for each layer of the 3-D printing.

23. A method for 3-D printing multiple layers of the concrete composition, the method comprising:
a) providing a mixture of the concrete composition of claim 1 with or without a setting agent;
b) measuring environmental conditions;
c) determining a target concrete temperature and desired horizontal and vertical print rate and layer height;
d) initiate mixing of the concrete composition with a mixing unit;
e) dosing setting agent, water and/or additional rheology modifier to the concrete composition mixture based on measured environmental conditions and desired horizontal and vertical print rates and layer height;
f) measuring an operating condition of a mixing, pumping, and/or extruding unit to provide a target operating condition based on determined target concrete temperature, print rate, and height of the layer;
g) adjusting dosing of water, rheology modifier or plasticizer based on the measured operating condition and achieving target operating condition;
h) applying the concrete composition to a base surface; and
i) repeating steps (f)-(g) for each layer of the 3-D printing.

24. The method of claim 23, wherein the measured operating condition of the mixing unit is the amperage of the mixing unit.

* * * * *